United States Patent Office 3,083,221
Patented Mar. 26, 1963

3,083,221
PREPARATION OF DI-TERTIARY-ALKYL
SULFATES
Walter H. Brader, Jr., Austin, Tex., assignor to Standard
Oil Company, Chicago, Ill., a corporation of Indiana
No Drawing. Filed May 5, 1960, Ser. No. 26,945
2 Claims. (Cl. 260—459)

This invention relates to di-tertiary-alkyl sulfates and more specifically pertains to the preparation of di-tertiary-butyl sulfate.

Dialkyl sulfates are generally prepared by the reaction between two moles of alcohol and one mole of sulfuryl chloride ($SO_2Cl_2$). A hydrogen chloride acceptor is employed since the reaction is reversible. Usually a weak base such as pyridine is employed as a hydrogen chloride acceptor. However, this process is not applicable for the preparation of the di-tertiary-alkyl sulfates for the presence of a base, even as weak a base as pyridine, interferes with the reaction. The di-tertiary-alkyl sulfates are relatively unstable and their preparation has been long sought because they would be useful intermediates, especially for introducing tertiary-alkyl groups. Probably the most unstable and most interesting di-tertiary-alkyl sulfate is di-tertiary-butyl sulfate.

A process has been discovered for the production and recovery of di-tertiary-alkyl sulfates whereby even di-tertiary-butyl sulfate can be prepared and recovered. This process comprises reacting a tertiary-alkyl alcohol with sulfuryl chloride in the presence of an inert solvent in which HCl is insoluble or only slightly soluble at temperatures of 0° to −50° C. At such temperatures the inert solvent should, of course, remain a liquid and should not dissolve more than 20 grams HCl per 100 grams of solvent, desirably 0 to 10 grams and preferably 0 to 5 grams HCl per 100 grams of solvent. The solvent should not decompose the di-tertiary-alkyl sulfate and for the economics of the desired reaction should not react with the alcohol or sulfuryl chloride. Suitable solvents can be selected from the alkane hydrocarbons. In selecting the inert solvent it is advantageous that the di-tertiary-alkyl sulfate be substantially insoluble therein. For the preparation of di-tertiary-butyl sulfate it is preferred to employ isopentane as the inert solvent.

The tertiary alcohol reactant can be any mono alcohol whose alkyl group contains 4 to 10 carbon atoms, and which contains at least one tertiary carbon atom; i.e., one carbon atom to which is attached three other carbon atoms. The tertiary-alkyl group is also a saturated hydrocarbon group. Such tertiary alcohols include tertiary-butyl alcohol, tertiary-amyl alcohol (2-methyl-butanol-2), 4-propyl-heptanol-4, 3-methyl-hexanol-3, 3-ethyl-pentanol-3, 2,2,3-trimethyl-butanol-3, 2,3-dimethyl-pentanol-3, 3-ethyl-pentanol-3, 2-methyl-hexanol-2, 3-methyl-hexanol-3, 2,3-dimethyl-butanol-2, 2-methyl-pentanol-2, 3-methyl-pentanol-3, 2-methyl-3-ethyl-pentanol-3, 2,2,4-trimethyl-pentanol-4, 3-ethyl-hexanol-3, 2-methyl-heptanol-2, 3-methyl-heptanol-3, and 4-methyl-heptanol-4. For practical purposes the tertiary alcohols desirably contain 4 to 8 carbon atoms. The preferred alcohol is tertiary-butyl alcohol.

The following specific examples are given to illustrate the process of this invention.

EXAMPLE I

The reaction is carried out in a 3-necked flask with stirrer, dropping funnel and condenser. One and four-tenths moles of $SO_2Cl_2$ and 250 ml. of isopentane are placed in the flask and the temperature of the mixture lowered to −40° C. and held there. Two moles of t-butyl alcohol are added dropwise to the mixture while nitrogen is passed through the system. After addition of the alcohol, stirring is continued at −40° C. until no more HCl is observed in the off gas. Since the product, di-tertiary-butyl sulfate, is expected to be relatively non-volatile, the reactants are removed by applying a high vacuum while the mixture is maintained at −20° C. A colorless product is obtained which is observed to decompose spontaneously at 0° C.

Table I
PRODUCT ANALYSIS

|  | Percent S By Wt. | Percent Cl By Wt. |
|---|---|---|
| $(C_4H_9O)_2SO_2$ | 15.2 (Theor.) | 0.0 |
| $C_4H_9OSO_2Cl$ | 18.6 (Theor.) | 20.3 (Theor.). |
| Product | 15.1±1.0 | 6.1±1.0. |

The above data indicate that the mixture is 30±5% monoester chloride and 70±5% diester. It should be pointed out that by making the ratio of alcohol/acid chloride about 1 the "chloro ester" would be the predominant product.

It is preferred when making substantially only the diester to react more than two moles of alcohol per mole of sulfuryl chloride as in the following example.

EXAMPLE II

The reaction is carried out in a 3-necked flask with stirrer, dropping funnel, and condenser. Into the flask are placed 200 ml. of isopentane and 1.0 mole of $SO_2Cl_2$, the mixture is cooled to about −40° C. and 2 moles t-butyl alcohol in 50 cc. isopentane are added at a rate which prevents the temperature from rising above −30° C. After addition of the alcohol, the mixture is stirred for an additional hour. Because the product, compound I, precipitates from the isopentane solution, it is separated from the reactants by decantation. Purification is effected by washing three times with liquid propane followed each time by decantation. The residual propane is removed under vacuum at −30° C. The product is a white, dry solid which softens at about 0° C. and decomposes slowly at room temperature into organic and acid phases.

Because of the instability of the product of Example II, conventional structure proofs are not possible. However, thermal decomposition of the material at room temperature gives two products as shown in the following equation:

Compound of Example II → Polyisobutene + $H_2SO_4$

A weighed sample of the compound of Example II is permitted to decompose; later the organic phase is separated by extraction with isopentane and the acid phase weighed. Table II shows the weight ratios of organic phase to pure compound.

Table II

DECOMOSITION OF DI-t-BUTYL SULFATE

| Sample No.: | Wt. organic/wt. sample |
|---|---|
| 1 | 0.535 |
| 2 | 0.536 |

If one examines the theoretical ratio for the various possible structures we can see, Table III, that the structures $(C_4H_9O)_2SO_2$ and $C_4H_9OS-H$ are the only ones which satisfactorily account for the observed results.

Table III

THEORETICAL WEIGHT RATIOS OF ORGANIC PHASE/
SAMPLE FOR VARIOUS ALKYL SULFATES

| Compound: | Weight organic phase/sample theoretical |
|---|---|
| $(C_4H_9O)_2SO_2$ | 0.534 |
| $C_4H_9OSO_2Cl$ | 0.320 |
| $C_4H_9OSO_2OH$ | 0.370 |
| $C_4H_9OSO_2H$ | 0.405 |
| $C_4H_9OS-H$ | 0.537 |
| $C_4H_9O\ SOH$ | .467 |

The nuclear magnetic resonance spectra are examined for this compound and the following structural features found:

(1) In the area in which C—H absorption occurs, no

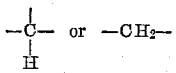

absorption occurs; i.e., no methyl group migration of the t-butyl alcohol occurs during the reaction.

(2) The —CH$_3$ absorption which occurs does so in the t-butyl region in which an electron withdrawing group is attached to the tertiary carbon.

(3) No acidic hydrogen absorption is observed; i.e., the compound is neutral.

(4) No mercaptan (—S—H) absorption is observed, thus eliminating the $C_4H_9OS-H$ structure.

(5) The acid phase absorption shows only protonic absorption; i.e., no $C_4H_9OSO_3H$ or $C_4H_9-SO_3H$ structures are possible. Therefore, $H_2SO_4$ is the only possibility for the acid phase composition.

Thus

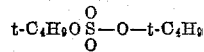

is the only consistent structure for compound I of Example II.

Because di-t-butyl sulfate (I) decomposes spontaneously at room temperature, it is examined as a t-butylating group. The following reactions may be carried out:

(1) 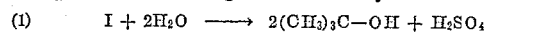

(2) 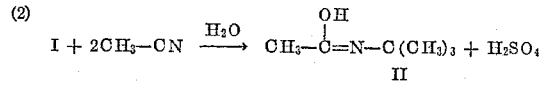

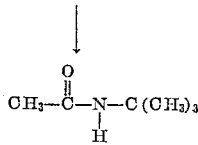

42% yield

Compound III is the intermediate commonly used for the preparation of $(CH_3)_3C-NH_2$.

(3) 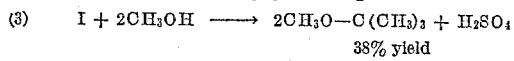

38% yield (4) 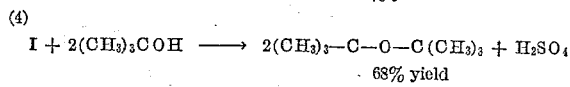

68% yield

The results hereinbefore presented prove that the compound of Example II is di-t-butyl sulfate. The compound is examined and found to be a powerful t-butylating agent. The process hereinbefore illustrated in Examples I and II is useful for using other t-alcohols to produce di-tertiary-alkyl sulfates.

What is claimed is:

1. A process for the preparation of di-tertiary-alkyl sulfates which comprises reacting at a temperature in the range of from 0° to —50° C. tertiary alkanols of 4 to 10 carbon atoms with sulfuryl chloride in the ratio of more than one mole of said alcohol per mole of sulfuryl chloride in the presence of an alkane hydrocarbon in which hydrogen chloride is not soluble to the extent of more than 20 grams per 100 grams of solvent at a temperature of from 0 to —50° C.

2. A process for the preparation of di-tertiary-butyl sulfate which comprises reacting at least two moles of di-tertiary-butyl alcohol with each mole of sulfuryl chloride in the presence of isopentane at a temperature in the range of from 0 to —40° C.

References Cited in the file of this patent

UNITED STATES PATENTS 1,641,005    McKee      Aug. 30, 1927

OTHER REFERENCES

Beilstein, vol. 1, 3rd supplement, 1950, page 1533 (1 page). (Copy in Patent Office Sci. Library.)